Figure 1:
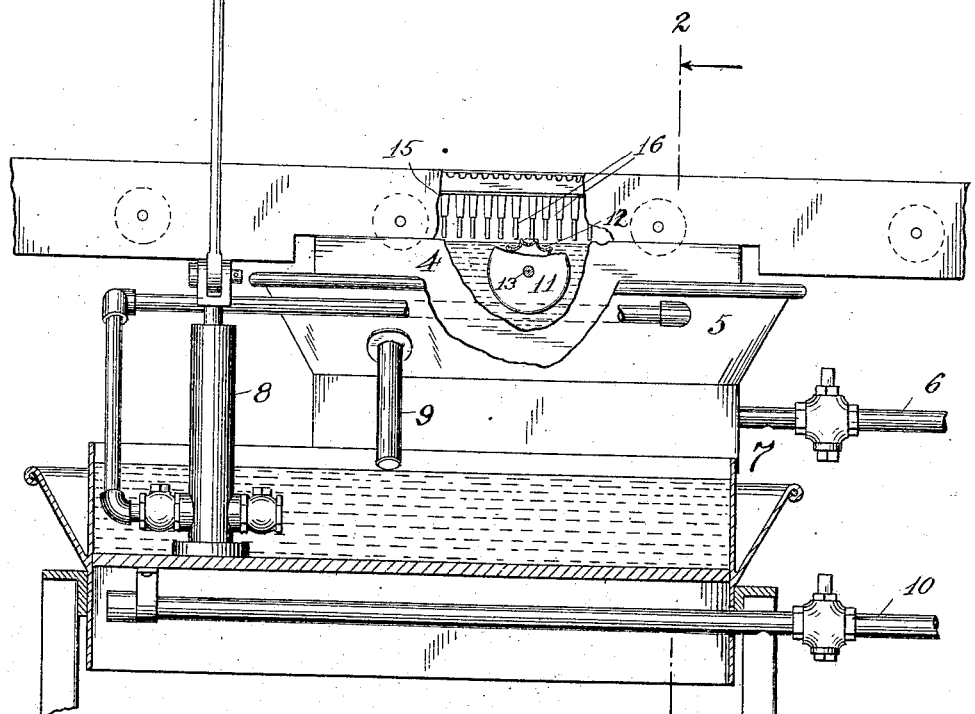

No. 840,822. PATENTED JAN. 8, 1907.
A. B. CALKINS.
MATCH MAKING MACHINERY.
APPLICATION FILED APR. 19, 1906.

2 SHEETS—SHEET 1.

WITNESSES:

INVENTOR

BY

ATTORNEYS

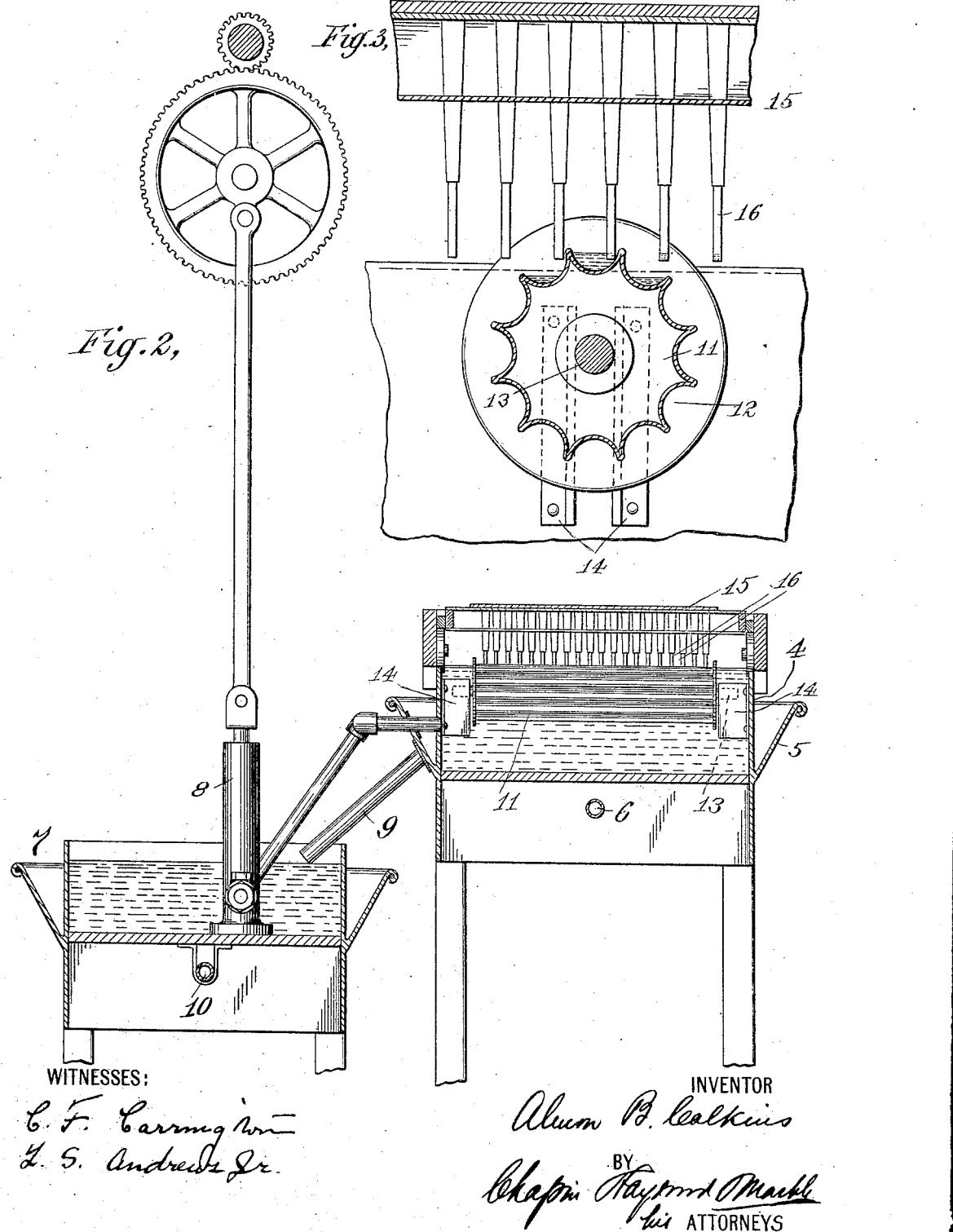

UNITED STATES PATENT OFFICE.

ALMON B. CALKINS, OF BELLEVILLE, NEW JERSEY, ASSIGNOR TO FERRAL C. DININNY, OF NEW YORK, N. Y.

MATCH-MAKING MACHINERY.

No. 840,822. Specification of Letters Patent. Patented Jan. 8, 1907.

Application filed April 19, 1906. Serial No. 312,588.

*To all whom it may concern:*

Be it known that I, ALMON B. CALKINS, a citizen of the United States of America, and a resident of Belleville, county of Essex, State of New Jersey, have invented certain new and useful Improvements in Match-Making Machinery, of which the following is a specification, reference being had to the accompanying drawings, forming a part thereof.

My invention relates to improvements in match-making machinery, and particularly to improvements in means for applying paraffin to match-splints prior to their being provided with a heading composition.

My invention consists principally in a feed-roller arranged to float freely in the tank containing the paraffin or the like, said roller being provided with peripheral indentations, preferably in the form of longitudinal flutings, so that, as the splints are caused to travel over the roller, engaging the periphery thereof as they do so, the roller will be thereby rotated. The indentations or flutings will thus be caused to carry up a modicum of the paraffin or the like to apply same to succeeding splints.

My invention further consists in certain novel combination of parts and details of construction, as will be fully described hereinafter.

In order that my invention may be fully understood, I will now proceed to describe an embodiment thereof with reference to the accompanying drawings, illustrating same, and will then point out the novel features in claims.

In the drawings, Figure 1 is a view in partial side elevation and partial vertical section, of an apparatus embodying my invention. Fig. 2 is a view in central transverse section therethrough. Fig. 3 is a detail view, on a larger scale, showing particularly the roller in section and splints presented thereto for the purpose of receiving paraffin or the like.

The tank for containing the liquid, hereinafter referred to as "paraffin," comprises a main portion 4, arranged to contain liquid paraffin, and an overflow gulley or channel 5, which completely surrounds the same. The paraffin is kept heated by any suitable means—such, for instance, as by a gas-burner 6, arranged beneath same.

7 designates a supply-tank arranged to contain a reserve supply of paraffin, the paraffin from the supply-tank being continuously pumped into the tank 4 by means of a pump 8, driven from any suitable source of power. A discharge-pipe 9 connects with the channel or gulley 5, discharging into the tank 7. The pump 8 preferably supplies an excess of paraffin to the tank 4, so that the same will always be kept full to overflowing, and the overflow will be received in the channel or gulley 5 and returned to the tank 7 through the discharge-pipe 9. A burner 10 or other means for supplying heat may be arranged in connection with the tank 7, so as to keep the paraffin therein in a liquid condition.

Located in the tank 4 is a feed-roller 11, having peripheral indentations 12 in the form of longitudinal flutings. The roller 11 is of less specific gravity as a whole than the liquid in which it is immersed, the said roller being here shown as hollow, so that when immersed it will displace an amount of liquid of a weight greater than its own. The tendency then will be for the roller to float with a considerable portion of its surface out of the liquid.

The roller 11 is provided with trunnions 13, disposed between side guides 14, secured to the walls of the tank 4. The side guides 14 prevent displacement sidewise of the roller, but allow the same to move freely up and down.

15 designates a splint-carrier arranged to carry splints 16, to which paraffin is to be applied. The carrier 15 travels over the roller 11, carrying the splints at such a level that they will engage the periphery of the roller 11. In fact, the tendency of the roller 11 will be to rise to a point higher than will be allowed by the splints, so that the splints will actually force the roller downward a short distance between its guides 14. The splints 16, engaging, as they do, the indentations 12, will as they pass over the roller revolve the roller, so that succeeding perforations will carry up a modicum of paraffin to present the same to succeeding splints.

The loose floating roller affords an excellent feeding means and being rotated by the splints themselves will feed only just the right quantity to the splints as the splints successively come along. The roller being entirely free and of such light weight will offer almost no resistance to the splints and will be readily turned thereby. Such a device is in its very nature absolutely automatic, as it is operated only by the movement of the splints, so that directly the splints cease to move the feeding-roller will also cease to move. Further, it will be understood that if one or more rows of splints were left out of the carriers the roller would remain stationary while the carrier was moving over same, revolving only as splints are actually presented for paraffining.

What I claim is—

1. In apparatus of the class described, the combination with a tank for containing liquid, of a roller arranged to be freely contained in said liquid, said roller of less specific gravity as a whole than the liquid in which it is arranged to be contained, and means for passing splints over said tank to engage the periphery of the said roller contained therein.

2. In apparatus of the class described, the combination with a tank for containing liquid, of a longitudinally-fluted roller arranged to be freely contained in said liquid, said roller of less specific gravity as a whole than the liquid in which it is arranged to be contained, and means for passing splints over said tank to engage the periphery of the said roller contained therein.

3. In apparatus of the class described, the combination with a tank for containing paraffin, of a roller arranged to float in said paraffin when the latter is in a liquid condition, and means for causing splints to engage the periphery of the roller and for rotating same.

4. In apparatus of the class described, the combination with a tank for containing liquid, of a roller arranged to float in the liquid therein, and means for passing splints over said tank to engage the periphery of the floating roller contained therein.

5. In apparatus of the class described, the combination with a tank for containing liquid, of a longitudinally-fluted roller arranged to float in the liquid therein, and means for passing splints over said tank to engage the periphery of the floating roller contained therein.

6. In apparatus of the class described, the combination with a tank for containing liquid, of a roller arranged to float in the liquid contained therein, side guides for the roller, and means for causing splints to engage the periphery of said roller.

7. In apparatus of the class described, the combination with a tank for containing liquid, of a longitudinally-fluted roller arranged to float in the liquid contained therein, side guides for the roller and means for causing splints to engage the periphery of said roller.

8. Means for applying paraffin or the like to match-splints comprising a roller arranged to float freely in the paraffin while the same is in a liquid condition, said roller having peripheral indentations, substantially as set forth.

9. In apparatus of the class described, the combination of a tank for containing liquid, a feeding-roll contained in said tank, said tank provided with an overflow-channel all the way round the exterior thereof, a second tank, a discharge-pipe from the overflow-channel to the second tank, and pumping means for pumping material from the second tank into the first tank.

In witness whereof I have hereunto set my hand.

ALMON B. CALKINS.

Witnesses:
P. W. KIWIT,
A. G. CALKINS.